Figure 1:
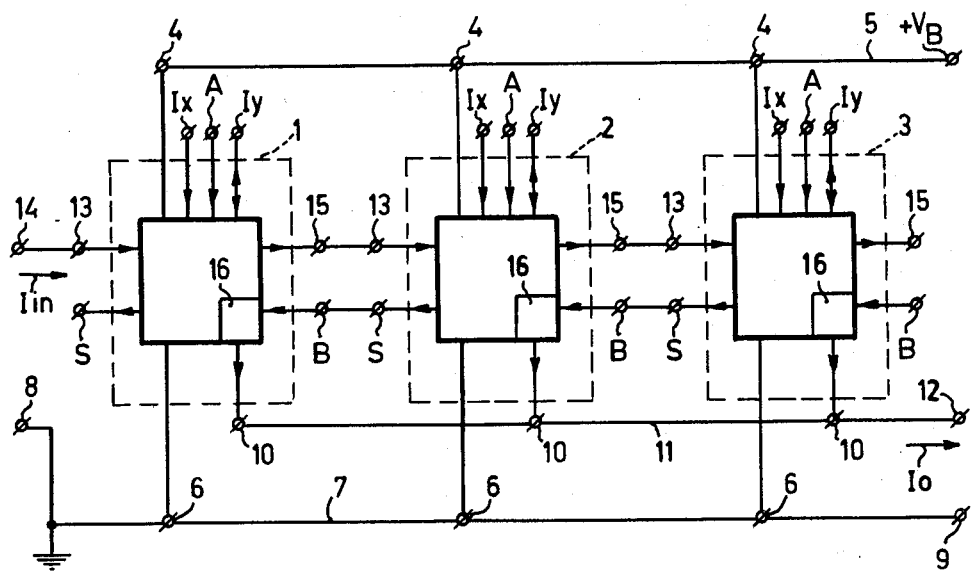

United States Patent [19]  
Korteling

[11] 3,894,224  
[45] July 8, 1975

[54] CURRENT-DRIVEN FUNCTION GENERATOR

[75] Inventor: Aart Gerrit Korteling, Emmasingel, Eindhoven, Netherlands

[73] Assignee: U.S. Philips Corporation, New York, N.Y.

[22] Filed: Mar. 11, 1974

[21] Appl. No.: 449,849

[30] Foreign Application Priority Data
Mar. 30, 1973 Netherlands...................... 7304430

[52] U.S. Cl................................. 235/197; 307/229
[51] Int. Cl............................................ G06g 7/26
[58] Field of Search ........... 235/197, 193, 194, 184; 307/229; 330/30 D

[56] References Cited
UNITED STATES PATENTS
3,443,081 5/1969 Nathan .............................. 235/197
3,659,082 4/1972 Rolfe ................................. 235/197
3,740,539 6/1973 Pace .................................. 235/197

Primary Examiner—Joseph F. Ruggiero
Attorney, Agent, or Firm—Frank R. Trifari; Simon L. Cohen

[57] ABSTRACT

Current-driven function generators appear to be of simple design, require few components and provide operational stability. A good accuracy can be maintained over a wide temperature range from −50°C to +150°C. By cascading a different number of identical sections and giving each section its own independent adjusting parameters, with a maximum of four and switching on only one section as a function of the input current, the other sections being blocked, almost any desired curve or special program can be obtained without the adjustment of one section affecting that of the other section. An embodiment using current mirrors, particularly suited for integrated techniques, is described.

5 Claims, 4 Drawing Figures

CURRENT-DRIVEN FUNCTION GENERATOR

The invention relates to a current-driven function generator having a function current input for the variable input current and a function current output for the output current produced as a function of the input current, consisting of n sections which are substantially identical and are cascaded.

In measuring and control technology it is often necessary to convert a measured quantity into a different quantity using a specific functional relationship. Generally, the measured quantity has already been converted into a voltage or current and the other quantity can also be made available in the form of a voltage or current. It is known to set up the desired functional relationship in a function generator, which generator is to be included in the measuring circuit and exactly provides the required, at any rate non-linear, relationship as is the case with a logarithmic converter, or as an approximation by means of curved or straight line sections, as is the case with many diode function generators.

Function generators may also be employed as program generators, which must provide a specific response as a function of place or time, a new, generally offset response being adjustable at fixed points or fixed instants. An example of this is the supply of heat to a conveyor oven.

It is an object of the invention to provide a function generator, which is of simple design, readily extendable, permits an intricate function or program to be set and has a good accuracy over a wide temperature range.

Accordingly, a function generator of the current driven type as mentioned in the preamble is characterized in that each section is provided: with a section current output which is connected to the function current output, only one section supplying current to the function current output as a function of the input current $I_{in}$, with a first input for a current of the value $I_{in}$, with a first output which supplies a current of the value $I_{in}$, with a second input for a current $I_x$, which if $I_{in} - I_x$ is greater than zero switches on the section, with a third input for a current $I_y$, which determines the initial value of the output current, with a switching output which supplies a switching signal when the section is operative, with an inhibiting input, which switches off the section upon receipt of a switching signal, and with a current converter with a current input, by means of which the gradient A between the input current and the output current is adjusted, and that each section with its first input is connected to the first output and with its switching output to the inhibit input of the preceding section, the first input of the first section being connected to the function current input. The gradient A between the input current and the output current is the rate of change of the output current with respect to the input current.

In this respect it is also advantageous that in general the generation of currents provides greater accuracy and stability than the processing of voltages. As a rule, several amplifiers are required in the latter instance, as comparator, buffer or to change the value of the voltage. To ensure the accurate and stable operation of each amplifier required, a multiplicity of steps are necessary which make the function generator expensive. A current-controlled type substantially mitigates said drawbacks, particularly because use can be made of integrated circuits, by means of which, as is known, simple current source arrangements can be realized such as, for example, of the current mirror type.

An advantage of a function generator according to the invention is moreover that each section which is operative produces a separate function response, which with at least three parameters allows all degrees of freedom to be adjusted. The drawback of most function generators, in which the adjustment and setting of one section affects the setting of the following sections, is thus obviated. Both discontinuous and smooth function curves are adjustable in the function generator according to the invention, certain sections in principle allowing changes to be made so as to introduce an extra non-linear effect, for example by the inclusion of additional resistors with diodes. The inclusion of a resistance in series with a current source may also cause a transition in the desired curve at the point which the current source is saturated owing to the resistance and then supplies a constant current in spite of an increasing current drive. It will be evident that parallel connection of said variations provides various possibilities per section. This may be useful in those cases in which a specific part of the desired curve is substantially invariable, so that some degrees of freedom of adjustment may be cancelled. An example of this is the series production of a specific function generator for a specific application, such as ignition timing or fuel injection control in combustion engines.

A further advantage is that only one power supply is used, one rail of which must be grounded, in contradistinction to the function generators provided with amplifiers, such as operational amplifiers, which need a positive and a negative supply.

Figure 2:
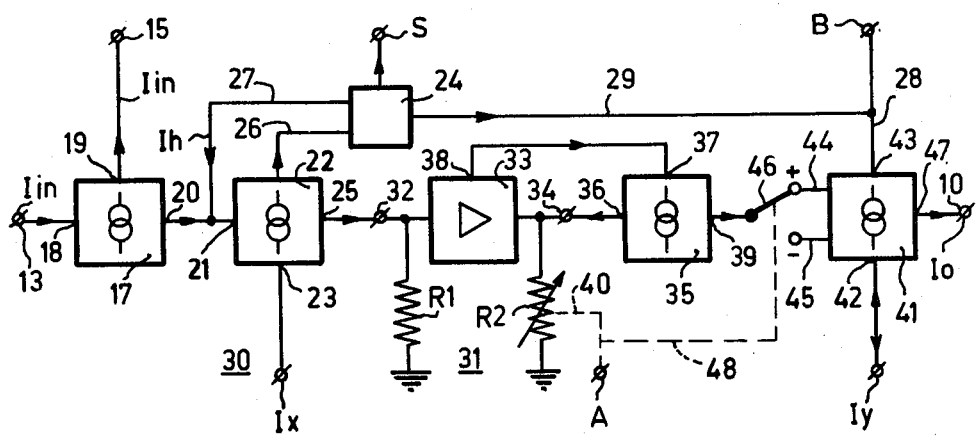
Figure 3:
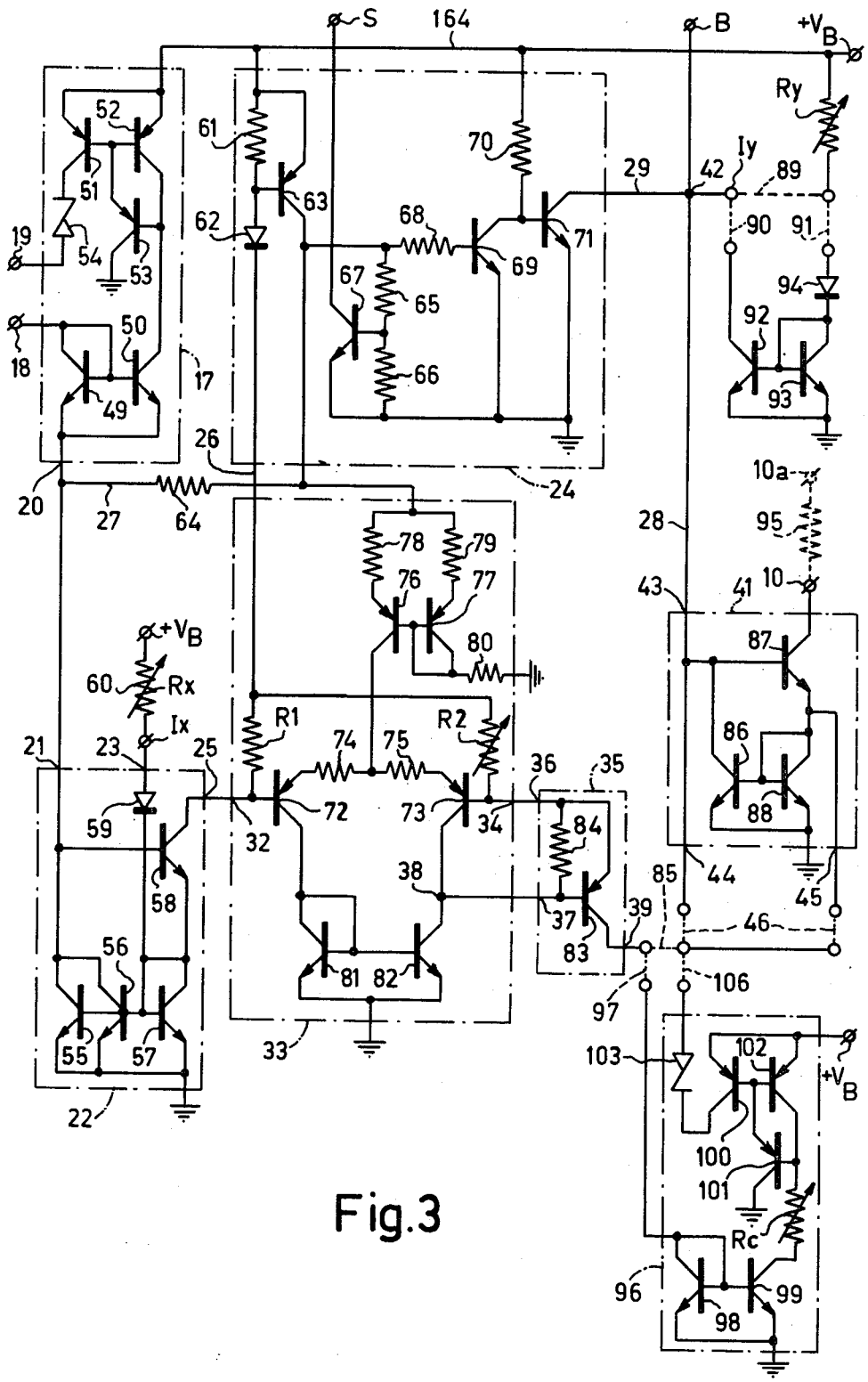
Figure 4:
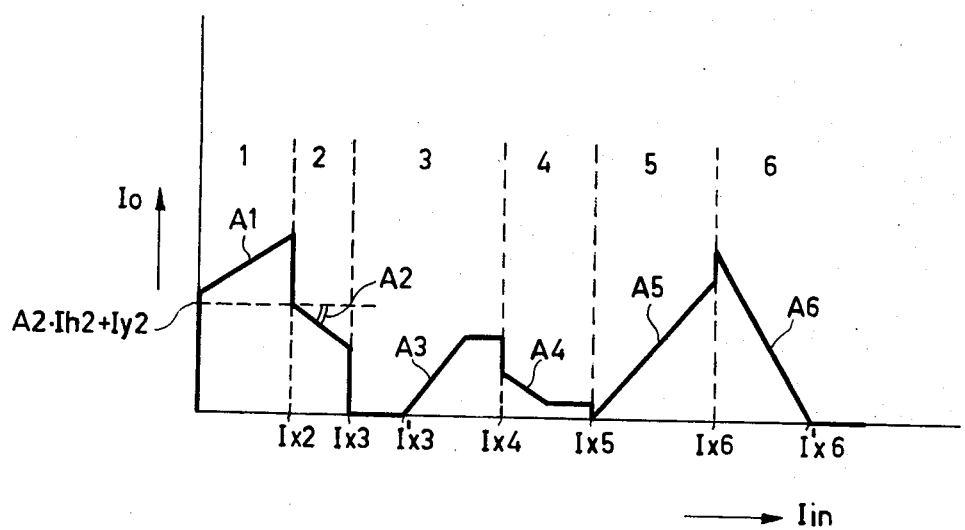

The invention will now be described in more detail with reference to the drawing, in which FIG. 1 represents a block diagram of a function generator according to the invention, FIG. 2 is a block diagram of one section with current source arrangements according to the invention, FIG. 3 is an elaborated diagram of one section with current mirrors, according to the invention, and FIG. 4 represents a current diagram as obtained by means of a function generator according to the invention.

FIG. 1 schematically represents the circuit arrangement of the function generator according to the invention. There are 3 sections 1, 2 and 3, which are prepresented identically and consequently have the same number of connection terminals.

Each section is connected to a supply line 5 by a terminal 4, and by a terminal 6 to a grounding line 7, to which also an input terminal 8 and an output terminal 9 of the function generator are connected.

The section current-outputs 10 are connected to the function current output 12 via a line 11. The first input 13 receives a current, which owing to the connection of terminal 13 to terminal 14 has a value of $I_{in}$ for section 1 because terminal 14 represents the function current input of the function generator. Each section supplies a current to the terminal 15 of a value equal or substantially equal to $I_{in}$ and said current flows to terminal 13 of the next section.

To the terminal $I_x$ a current $I_x$ is applied and if $I_{in} - I_x$ becomes greater than zero this current defines the points in the current diagram at which the section is switched on. This causes a switching signal at the output S, which is fed to an inhibiting input B of a preceding section. As a result, the preceding section is switched off simultaneously, which means that a current $I_o$ which was supplied by said section to its function current output 10, becomes zero, while the section just switched on supplies a new value for $I_o$ to the output 10. The new value $I_o$ is determined by a current $I_y$, which is applied to terminal $I_y$. The response of the output current $I_0$ upon the next increase of the output current $I_{in}$ is determined by a gain factor or a current conversion factor which in the case of a linear response is denoted by the gradient A. It is possible to make this response slightly non-linear. In the FIG. 1 control of the gradient or the average gradient is denoted by the terminal A per section. FIG. 1 shows that the output S of the first section 1 is not used and that the inhibiting input B of the last section 3 as well as its terminal 15 are not connected either. If desired, terminal 15 may be connected to the ground line 7 via a resistance, so as to drain the current $I_{in}$ supplied by said section. Each section also shows a block 16, to which the terminals 10 and B are connected so as to indicate that the output current of each section can be blocked.

FIG. 2 shows the functional lay-out of one section, which mainly employs current source circuits, as preferably included in an embodiment of the invention. The input current $I_{in}$ is fed to the terminal 13 which is connected to the current control input 18 of a first current source circuit 17, which supplies a substantially equal current ot its first current output 19, which is connected to terminal 15 and which supplies a current to a second current output 20, which is connected to a first current control input 21 of a current source circuit 22, which is associated with a a second current source circuit 30. Said current I may have a value equal to $I_{in}$, but it may also be substantially proportional to $I_{in}$. To terminal $I_x$ a current of the value $I_x$ is applied for the second current control input 23 of current source circuit 30, which is furthermore provided with a switching section 24 and a current output 25. Via the line 26 the switching section 24 is actuated if in the current source circuit 22 $I - I_x$ becomes greater than zero. To ensure rapid switching the switching section 24 via a connection 27 supplies a current $I_h$ in an additive sense to the input 21, so that output 25 at least supplies a current $I_h$, and switching section 24 supplies a defined switching signal to terminal S. Moreover, the section is unblocked by a similar switching signal at line 29, which is connected to line 28 and the blocking input B, becoming zero. When $I = I_{in}$, which is normal, the current at current output 25 will have a value $I_{in} - I_x + I_h$. Said current flows via a first input 32 of a current converter 31 through a resistance $R_1$ to a reference potential, which for example may be ground potential. Said device 31 furthermore includes a differential amplifier 33 having a second input 34, which is also connected to ground by means of a resistance $R_2$, and a third current source circuit 35, which has a control input 37 which is connected to the output 38 of the amplifier 33. The current source circuit 35 supplies a current $I_{39}$ to its first current output 39 for further processing and a substantially equal current $I_{36}$ to a second current output 36 which is connected to an input 34. The amplifier 33 and the current source 35 constitute a control system, the voltage at terminal 32 being maintained equal to the voltage at terminal 34. Thus $(I_{in} - I_x + I_h) \cdot R_1 = I_{36} \cdot R_2$. It follows that $I_{39} = (I_{in} - I_x + I_h) \cdot R_1/R_2$. The resistance $R_2$ may be variable, as shown. The resistance $R_1$ may also be variable. As the resistance ratio determines the gradient between the current $I_{39}$ and the input current $I_{in}$, this means that the gradient is now adjustable, which is symbolically represented by the line 40 to the control input A.

A fourth current source circuit 41 is connected by current input 42 to the third input $I_y$ of the section for supplying or draining a current of the value $I_y$, which determines the initial value, of the output current $I_o$ at terminal 10 after the section is switched on. The current source circuit 41 is provided with a inhibiting input 43 which is connected to line 28, which ensures that in the presence of a switching signal, either derived from line 29 or from inhibiting input B, the output 47 does not supply a current to the section current output 10. Furthermore, a current input 44 is provided, which via a change-over circuit 46 can receive the current $I_{39}$ and subsequently adds said current in an additive sense to $I_y$ in source 41, and a current input 45, which does the same in a subtractive sense. Thus, positive and negative gradients A can be adjusted respectively. Control of switch 46 is symbolically represented by line 48 to control input A.

FIG. 3 is an elaborated diagram whose arrangement is suitable for integration. Corresponding parts of FIG. 2 bear the same reference numerals. The current source circuits are for the most part constituted by current mirrors. The first current source circuit 17 comprises two current mirrors, of which the first one includes a transistor 49 connected as a diode, which transistor is coupled to the input terminal 18 for the current $I_{in}$, and the transistor 50 coupled thereto. The collector current of transistor 50, which as a result of the current-mirror property has the same value $I_{in}$, is supplied to the second current mirror, which via the transistors 53 and 52 is biassed so that the transistor 51 again supplies a current $I_{in}$ via a voltage limiting zener diode 54 to the current output terminal 19. The current output 20 supplies a current $21_{in}$ to the input 21 of the second current source circuit 22, which consists of the two parallel-connected transistors 55 and 56, which constitute the input diode of the current mirror and which reduce the control current $21_{in}$ to a current $I_{in}$, upon which the transistor 57 and the transistor 58, which are connected as diodes, are set to a value $I_{in}$, so that at a collector of transistor 58 and thus at current output 25 a current $I_{in}$ can be made available. However, via the input $I_x$ a current $I_x$ is injected at the input terminal 23, which is subtracted from $I_{in}$, so that the output 25 is currentless if $I_x$ is greater than $I_{in}$. The current $I_x$ can simply be obtained by connecting a variable resistance $R_x$ to the supply terminal $+V_B$ and the terminal $I_x$. A diode 59 has been included in this circuit in order to obtain two diode junctions between the supply voltage $+V_B$ and ground. By giving the supply voltage the same temperature coefficient as that of the two diodes a temperature-independent current $I_x$ can be obtained. In order to detect whether $I_{in} - I_x$ is greater than zero, which means that there is a small current to the output 25 of the current source circuit 22, said current is derived via the resistance $R_1$ of the differential amplifier 33 from the switching section 24 across a resistance 61 and a diode 62, so that a transistor 63 will draw current from the supply line 164, which is connected to the supply voltage $+V_B$. A part of the collector current of transistor 63 flows via the resistance 64 and the connection 27 to input 21 of current source 22, so that a switching through effect is obtained, which results in transistor 63 being bottomed, while the current via line 27 attains the value of the hysteresis current $I_h$, a supply current is fed to the differential amplifier 33 and the switching section 24 is further activated. For this purpose the collector of transistor 63 is connected by a resistance 65 to the base of a transistor 67, whose emitter is connected to earth and whose collector is connected to output S. Consequently, the switching signal is produced by bottoming of transistor 67, the output S being connected to ground. Moreover, a transistor 69 is bottomed, whose base by a resistance 68 is connected to the collector of transistor 63, whose emitter is connected to earth and whose collector is connected by a resistance 70 to the supply line 164. The base of a transistor 71 is connected to the collecter of transistor 69, the emitter is connected to ground and the collector to line 29.

Thus, a complementary switching signal is available at the line 29. The differential amplifier 33 consists of transistors 72 and 73, which via emitter resistances 74 and 75 are connected by their emitters to a current source circuit including the transistor 77, connected as a diode, whose emitter is fed via a resistance 79 by the bottomed transistor 63 and whose collector via a resistance 80 is connected to ground. The transistor 76, whose base is connected to the base of transistor 77 and whose emitter via a resistance 78 is connected to the collector of transistor 63, supplies the constant collector current to the junction point of the resistances 74 and 75. The collector circuits of transistors 72 and 73 are constituted by the current mirror consisting of transistor 81, which is connected as a diode, and transistor 82 respectively, whose emitters are connected to ground. The collectors of transistors 82 and 73 are interconnected and connected to the amplifier output 38.

The base of transistor 72 is connected to the one amplifier input 32 and to one terminal of resistance $R_1$, the base of transistor 73 is connected to the other amplifier input 34 and to one terminal of a variable resistance $R_2$, while the other connections of the said resistances are connected to each other and to the supply line 164 via the diode 62 and the base-emitter junction of transistor 63. If the voltage across $R_1$ is too high, transistor 72 draws much current and transistor 73 draws little current. Transistor 81 will bias transistor 82 so that the transistor 82 will be bottomed by the available small collector current, so that the output 38 will have a high potential relative to the amplifier input 34. If the voltage across $R_2$ is too high, transistor 73 is bottomed, which implies that there will hardly be a potential difference between points 34 and 38. For the purpose of current control and automatic balancing the current source circuit 35 is included between connections 34 and 38 with its input 36 and its input 37 respectively. The current source 35 consists of a transistor 83 whose base is connected to the input 37, whose emitter is connected to input 36 and whose collector is connected to output 39. The current obtained at output 39 can be supplied via a connection 85 to the change-over circuit 46 and thus to input 44 in an additive sense or to an input 45 of the current source circuit 41 in a subtractive sense. Said current source circuit has an input terminal 43, which is interconnected to input 44 and the input 42 for supplying or draining the bias current $I_y$, which determines the initial value of the output current $I_o$, which is available via the output terminal 10. The current source circuit 41 consists of the transistor 86, which drains the current from the inputs 43 and 44 and which is biassed by the transistor 88, connected as a diode, which in its turn is supplied by the emitter follower 87, whose collector is connected to the output 10. If input 43 is connected to ground by the switching signal at inhibiting input B or by the complementary switching signal of transistor 71, transistor 87 cuts off and no output current $I_o$ can be supplied. As the input $I_y$ and thus input 42, input 43 and input 44 are interconnected, a $I_{thd\ y}$ and possibly a current from output 39 will be drained to ground.

The bias current $I_y$ can simply be applied by connecting terminal $I_y$ by a connection 89 to a resistance $R_y$ whose other end is connected to the supply line 164. It is to be noted that, as previously stated, the voltage relative to ground at the input $I_y$, in a similar way as that at input $I_x$, has a value of two diode junction voltages, namely the $V_{BE}$ of transistor 87 and the $V_{BE}$ of transistor 88.

An output of a current $I_y$ is provided by a current mirror including transistors 92 and 93, the input $I_y$ being connected by a connection 90 to the collector of transistor 92, and the bias resistance $R_y$ by a connection 91 to the transistor 93, connected as a diode, with the additional diode 94.

As long as the current from output 39, via connection 85 and the input 44 via the input 43 to transistor 92 has not assumed the value which is determined by the setting of the current mirror with $R_y$, transistor 92 will remain bottomed so that current source 41 is cut off. At an increasing current $I_{in}$, $I_o$ will therefore be zero. After that $I_o$ will increase with the adjusted gradient A. This provision also allows a compensation for the hysteresis current $I_h$ to be obtained.

For some characteristics of a function generator it is desirable to have a horizontal portion.

At increasing current $I_{in}$ the current $I_o$ must remain constant. For this horizontal portion a separate section is to be employed, at which only the parts 17, 22, 24, $I_y$ and 41 are required, the differential amplifier 33 and the source 35 not being used. However, said section may be dispensed with if the preceding section provides said horizontal portion in the curve, for example by deriving the output current $I_o$ from a terminal 10a, which by a resistance 95 is connected to output 10. Since transistor 87 in current source 41 is bottomed owing to the said provision, the output current $I_o$ will be limited and consequently be constant, despite an increasing current $I_{in}$.

In the case of negative gradients A the dimensioning may be such that the output current becomes zero owing to transistor 87 being cut off. A current of constant value can now be applied from a separate current source circuit to terminal 10.

FIG. 3 shows another possibility of extending of a section, by means of which both for positive and negative gradients A a constant output current $I_o$ is obtained. A section according to the invention, in addition to the adjusting facilities $I_x$, $I_y$ and A, then includes an adjusting facility $R_c$, consisting of a variable resistance which determines the transition to a horizontal portion in the function curve. For this purpose a block 96 is provided which includes a double current mirror. The current from output 39 is not fed via connection 85, but via a connection 97 to the transistor 98, which is connected as a diode, and which biasses the transistor 99 so as to obtain the same current. The collector current of said transistor via a transistor 101 biasses transistor 102 so that transistor 100 supplies a collector current via a zener diode 103 to a connection 106 for the changeover circuit 46 for positive and negative gradients.

Owing to the properties of the current mirrors the current in connection 97 will equal the current in connection 106. However, since the variable resistance $R_c$ is included in the collector circuit of transistor 102 and transistor 99, the current therein cannot increase any further so that transistor 99 is bottomed. Thus, this enables a constant output current $I_o$ to be adjusted.

The adjusting capabilities of a function generator according to the invention are particularly apparent in the case of a desired function or a program as represented in FIG. 4. The section 1 is adjusted with $I_{x_1} = 0$, after which the positive gradient $A_1$ is determined and by means of the value of $I_{y_1}$ the height is adjusted. $R_c$ is then zero or the unit 96 in FIG. 3 is not switched on. Section 2 switches on at $I_{x_2}$ and blocks section 1. The gradient $A_2$ is made negative. Section 3 switches on and blocks section 2 at $I_{in} = I_{x_3}$. $I_{y_3}$ must be negative and assumes a value of $(I_{x_3}' - I_{x_3} + I_{h_3}) \cdot A_3$, so that at $I_{x_3}'$ the positive gradient $A_3$ commences. By adjusting $R_c$ the horizontal portion can be shifted in height. At $I_{in} = I_{x_4}$ section 4 is switched on and section 3 is blocked. The negative slope $A_4$ is determined, the positive current $I_{y_4}$ is set and by means of $R_c$ the horizontal portion is shifted in height. In section 5 $I_{y_5}$ is negative and equals $A_5 \cdot I_{h_5}$, for the output current $I_o$ should start at a value of zero. Section 6 starts at a high positive current $I_{y_6}$, and has a substantially negative gradient $A_6$. $R_c$ must be zero or unit 96 in FIG. 3 is not included, for at $I_{in} = I'_{x_6}$ $I_o$ becomes zero, because $I_{y_6} = (I'_{x_6} - I_{x_6}) \cdot A_6$.

It has already been stated that for a special application the sections need not necessarily be identical. Certain adjusting facilities may be dispensed with or may have a fixed value $I_x$, $I_y$, A, $R_c$. Furthermore, it may be useful when designing a fully integrated function generator to accommodate certain functional units on one chip, for example all input current sources which in FIG. 3 are represented by the block 17, or, for shifting the entire function, an additional variable current source may be included, so that the current $I_y$ per section can be reduced. It is obvious that if a function is to be set for the first time a laboratory apparatus provided with a multiplicity of identical sections with all adjusting facilities, as described herein, is a necessity. However, it is not a departure from the concept underlying the invention in a final design for an application simplifications are introduced or the components are re-arranged.

What is claimed is:

1. A current-controlled function generator having a function current input for the variable input current and a function current output for the output current produced as a function of the input current, consisting of n sections, which are substantially identical and are cascaded, each section comprising a section current output which is connected to the function current output, only one section supplying current to the function current output as a function of the input current $I_{in}$, with a first input for a current of the value $I_{in}$, with a first output which supplies a current of the value $I_{in}$, with a second input for a current $I_x$, which when $I_{in} - I_x$ is greater than zero switches on the section, with a third input for a current $I_y$, which determines the initial value of the output current, with a switching output which supplies a switching signal when the section is switched on, with a inhibiting input, which switches off the section upon receipt of a switching signal, and with a current converter with a control input, by means of which the gradient A between the input current and the output current can be adjusted, and that each section is connected with its first input to the first output and with its switching output to the inhibiting input of the preceding section, the first input of the first section being connected to the function current input.

2. A function generator as claimed in claim 1, characterized in that each section includes at least four current source circuits, a first one of said four sections having a current control input connected to the first input of the section, a first current output connected to the first output and furthermore a second current output connected to a first current control input of a second current source circuit, the second current source circuit being provided with a second current control input, connected to a second input of said section, and with a switching section for supplying the switching signal to the switching output and a complementary switching signal to the inhibiting input, the switching section being activated if $I_{in} - I_x$ is greater than zero, after which a current $I_{in} - I_x$ is obtained at a current output, said current output of said switching section being connected to the current converter, said current converter including a third current source circuit having a first current output connected to a fourth current source circuit, said fourth current source circuit including the third input for the current $I_y$, the inhibiting input and the sectional current output, so that the output current $I_o$ equals $(I_{in} - I_x) \cdot A + I_y$.

3. A function generator as claimed in claim 2, characterized in that the switching section is provided with a current output for supplying a hysteresis current $I_h$ to the first control input in a re-generative sense, so that at the current output of the second current source circuit, after $I_{in} - I_x$ has become greater than zero, a current $I_{in} - I_x + I_h$ is obtained.

4. A function generator as claimed in claim 2, characterized in that the current convertor includes a differential amplifier, said differential amplifier being provided with a first input with a resistance $R_1$ connected to a reference potential and to which the current output of the second current source circuit is connected, said differential amplifier having a second input connected to the reference potential through a resistance $R_2$, a second current output of the third current source circuit being connected to said differential amplifier, a control input of said current source circuit being connected to the output of the differential amplifier so as to maintain the voltage at the first and the second input equal, so that the gradient A is defined by $R_1/R_2$, one of said resistances being adjustable by means of the control input of the converter.

5. A function generator as claimed in claim 2, characterized in that connection between the first current output of the third current source circuit and the fourth current source circuit includes a fifth current source circuit for transferring the input current to the fourth current source circuit up to an adjustable maximum value, so that at an increasing input current the output current remains constant up from said maximum value.

* * * * *

UNITED STATES PATENT AND TRADEMARK OFFICE
CERTIFICATE OF CORRECTION

PATENT NO. : 3,894,224
DATED : July 8, 1975
INVENTOR(S) : AART GERRIT KORTELING

It is certified that error appears in the above-identified patent and that said Letters Patent are hereby corrected as shown below:

IN THE SPECIFICATION

Col. 2, line 48, "prepre-" should be --repre- --;

Col. 3, line 13, before "Fig" cancel "the";

line 30, "ot" should be --to--;

Col. 4, line 40, "$2l_{in}$" should be --$2I_{in}$--;

line 44, "$2l_{in}$" should be --$2I_{in}$--;

Col. 6, line 12, "$I_{Ihd\ y}$" should be --current $I_y$--;

Signed and Sealed this sixteenth Day of September 1975

[SEAL]

Attest:

RUTH C. MASON
Attesting Officer

C. MARSHALL DANN
Commissioner of Patents and Trademarks